United States Patent
Seo et al.

(10) Patent No.: US 8,235,854 B2
(45) Date of Patent: Aug. 7, 2012

(54) POWER TRAIN FOR HYBRID VEHICLE

(75) Inventors: Kangsoo Seo, Gyeonggi-do (KR);
Hyutae Shim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 334 days.

(21) Appl. No.: 12/622,989

(22) Filed: Nov. 20, 2009

(65) Prior Publication Data

US 2010/0273593 A1    Oct. 28, 2010

(30) Foreign Application Priority Data

Apr. 23, 2009  (KR) .................. 10-2009-0035354

(51) Int. Cl.
  *F16H 3/72* (2006.01)
(52) U.S. Cl. .............................. 475/5; 475/282; 475/317
(58) Field of Classification Search .............. 475/5, 282, 475/317
See application file for complete search history.

(56) References Cited

U.S. PATENT DOCUMENTS

2006/0229153 A1* 10/2006 Bucknor et al. .................. 475/5
2007/0225097 A1*  9/2007 Raghavan et al. ............... 475/5

FOREIGN PATENT DOCUMENTS

| JP | 2005-067319 A | 3/2005 |
| JP | 2005-138803 A | 6/2005 |
| JP | 2007-314034 A | 12/2007 |
| JP | 2008-056236 A | 3/2008 |
| JP | 2008-114812 A | 5/2008 |
| JP | 2008-286294 A | 11/2008 |
| KR | 10-2008-0032131 A | 4/2008 |

* cited by examiner

*Primary Examiner* — David D Le
*Assistant Examiner* — Derek D Knight
(74) *Attorney, Agent, or Firm* — Edwards Wildman Palmer LLP; Peter F. Corless

(57) ABSTRACT

The present invention provides a power train for a hybrid vehicle that can achieve a fixed gear ratio mode where a vehicle is driven at a fixed gear ratio, such as shift stages of common transmission, only by the driving force of an engine without driving a motor generator, as well as an electric vehicle mode and a hybrid mode that are basic driving modes of a hybrid vehicle, such that it is possible to drive the vehicle with high efficiency in accordance with traveling conditions of the vehicle and improve fuel efficiency. Further, according to the power train for a hybrid vehicle, the number of gear teeth of a sun gear and a pinion of a planetary gear set, which is a component, can be changed in various ways, such that it is possible to more freely select the capacity of a clutch or a motor generator. Therefore, it is possible to design a compact transmission.

22 Claims, 5 Drawing Sheets

| DRIVING MODE | | CL1 | CL2 | BK1 | BK2 |
|---|---|---|---|---|---|
| EV | EV1 | | | ● | |
| | EV2 | | ● | ● | |
| HEV | HEV1 | | | ● | |
| | HEV2 | ● | | | |
| | HEV3 | | ● | | |
| FIXED GEAR RATIO | FIRST STAGE | ● | | ● | |
| | SECOND STAGE | | ● | | ● |
| | THIRD STAGE | ● | ● | | |
| | FOURTH STAGE | ● | | | ● |

POWER TRAIN FOR HYBRID VEHICLE

CROSS-REFERENCE TO RELATED APPLICATIONS

The present application claims priority to Korean Patent Application Number 10-2009-0035354 filed Apr. 23, 2009, the entire contents of which application is incorporated herein for all purposes by this reference.

BACKGROUND

1. Technical Field

The present disclosure relates to a power train for a hybrid vehicle, in more detail a technology for transmitting power from power sources to the driving wheels in a hybrid vehicle equipped with two or more different power sources, including an internal combustion engine.

2. Related Art

Hybrid vehicles using an engine and a motor generator improve fuel efficiency of the vehicles by achieving functions of idle stop and regenerative braking, on the basis of a technology of driving the vehicles at low velocity by using power from the motor generator having relatively excellent low-velocity torque characteristics and driving the vehicles at high velocity by using power from the engine having relatively excellent high-velocity characteristics.

Further, hybrid vehicles do not produce exhaust gas from the engine when being driven only by a motor generator, which is recognized as an environmental-friendly vehicle technology having advantages of improving fuel efficiency and reducing exhaust gas.

The power train for hybrid vehicles is required to provide sufficient driving force and high fuel efficiency.

The information disclosed in this Background section is only for enhancement of understanding of the general background of the invention and should not be taken as an acknowledgement or any form of suggestion that this information forms the prior art already known to a person skilled in the art.

BRIEF SUMMARY OF THE DISCLOSURE

Various aspects of the present invention are directed to provide a power train for a hybrid vehicle that can achieve a fixed gear ratio mode where a vehicle is driven at a fixed gear ratio, such as shift stages of common transmission, only by the driving force of an engine without driving a motor generator, as well as an electric vehicle mode and a hybrid mode that are basic driving modes of a hybrid vehicle, thereby driving the vehicle with high efficiency in accordance with traveling conditions of the vehicle and improving fuel efficiency.

In one aspect, the present invention provides a power train for a hybrid vehicle comprising: a first planetary gear set that has at least four rotary elements; a second planetary gear set that has three rotary elements, two of which are connected with two of the rotary elements of the first planetary gear set and at least one of which is disconnected or connected; and a first brake that is configured to restrain rotation of one rotary element of the second planetary gear set, wherein at least two or more independent power sources and an output element are connected to the rotary elements of the first planetary gear set and the second planetary gear set.

Preferably, the rotary element, the rotation of which is restrained by the first brake, of the second planetary gear set may be disconnected or connected with a rotary element of the first planetary gear set by a first clutch, and the output element may be connected to the rotary element, which is not connected with the rotary elements of the first planetary gear set, of the second planetary gear set. In this case, the power source may include an engine and a first motor generator that are connected to the first planetary gear set; and a second motor generator that is connected to the second planetary gear set. Further, the first planetary gear set, the second planetary gear set, the first motor generator, and the second motor generator may be arranged such that rotary shafts overlap each other to form a single shaft. Also, the first planetary gear set may be a long pinion type planetary gear set having four rotary elements including a first sun gear and a third sun gear that are independently engaged with one long pinion, and two rotary elements, which are not connected to the engine and the first motor generator, of the first planetary gear set may be at least disconnected or connected with the rotary elements of the second planetary gear set. Suitably, the engine may be connected to a first carrier of the first planetary gear set, the first motor generator may be connected to a third sun gear of the first planetary gear set, the second motor generator may be connected to a second sun gear of the second planetary gear set, the output element may be connected to a second carrier of the second planetary gear set, the first brake may be connected to a second ring gear of the second planetary gear set, and the first clutch may be disposed between the first sun gear of the first planetary gear set and the second ring gear of the second planetary gear set.

The first ring gear of the first planetary gear set and the second sun gear of the second planetary gear set may be directly connected.

Preferably, the power trains may further comprise: a second brake that is configured to restrain rotation of the second sun gear of the second planetary gear set; and a second clutch that is configured to connect or disconnect the first carrier of the first planetary gear set to the second ring gear of the second planetary gear set.

Suitably, the power trains may further comprise a second clutch that is configured to disconnectably connect the first ring gear of the first planetary gear set with the second sun gear of the second planetary gear set.

Preferably, the power trains may further comprise: a second brake that is configured to restrain rotation of the first ring gear of the first planetary gear set; a second clutch that is configured to disconnectably connect the first ring gear of the first planetary gear set with the second sun gear of the second planetary gear set; and a third clutch that is configured to disconnectably connect the first carrier of the first planetary gear set with the second sun gear of the second planetary gear set.

Preferably, the engine may be connected to a first ring gear of the first planetary gear set, the first motor generator may be connected to a third sun gear of the first planetary gear set, the second motor generator may be connected to a second sun gear of the second planetary gear set, the output element may be connected to a second carrier of the second planetary gear set, the first brake may be connected to a second ring gear of the second planetary gear set, and the first clutch may be disposed between the first sun gear of the first planetary gear set and the second ring gear of the second planetary gear set. In this case, the first carrier of the first planetary gear set and the second sun gear of the second planetary gear set may be directly connected.

The power trains may further comprise a second clutch that is configured to disconnectably connect the first carrier of the first planetary gear set with the second sun gear of the second planetary gear set.

Preferably, the long pinion of the first planetary gear set may have the same number of gear teeth at the portions where the first sun gear is engaged and the third sun gear is engaged. Also preferably, the long pinion of the first planetary gear set may have different numbers of teeth at the portions where the first sun gear is engaged and the third sun gear is engaged.

In another aspect, the present invention provides a power train for a hybrid vehicle, comprising: a first planetary gear set that has four rotary elements; a second planetary gear set that has total three rotary elements, two of which are at least disconnectably connected to the first planetary gear set; a first brake that is configured to restrain rotation of one rotary element of the second the planetary gear set, which are at least disconnectably connected to the first planetary gear set; an output element that is connected to the rotary element of the second planetary gear set, which is not the rotary elements of the second planetary gear set that are at least disconnectably connected to the first planetary gear set; and at least two power sources that are disposed to independently apply driving force to the rotary elements of the first planetary gear set and the second planetary gear set.

Preferably, the power source may include: an engine and a first motor generator that are connected to the rotary elements of the first planetary gear set, respectively; and a second motor generator that is connected to the rotary element, which is at least disconnectably connected to the rotary element of the first planetary gear set, of the second planetary gear set. In this case, the first planetary gear set may be a long pinion type planetary gear set having four rotary elements including a first sun gear and a third sun gear, and a first carrier and a first ring gear, which are independently engaged with one long pinion, the second planetary gear set may be a single pinion planetary gear set including a second sun gear, a second carrier, and a second ring gear, a first clutch may be disposed between the rotary element, the rotation of which is restrained by the first brake, of the second planetary gear set and the rotary elements of the first planetary gear set, and the engine may be connected to the first carrier of the first planetary gear set.

Further, the first ring gear of the first planetary gear set and the second sun gear of the second planetary gear set may be directly connected.

Preferably, the power trains may further comprise: a second brake that is configured to restrain rotation of the second sun gear of the second planetary gear set; and a second clutch that is configured to disconnectably connect the first carrier of the first planetary gear set with the second ring gear of the second planetary gear set.

The power trains may further comprise a second clutch that is configured to disconnectably connect the first ring gear of the first planetary gear set with the second sun gear of the second planetary gear set.

The power trains may further comprise: a second brake that is configured to restrain rotation of the first ring gear of the first planetary gear set; a second clutch that is configured to disconnectably connect the first ring gear of the first planetary gear set with the second sun gear of the second planetary gear set; and a third clutch that is configured to disconnectably connect the first carrier of the first planetary gear set with the second sun gear of the second planetary gear set.

Preferably, the first planetary gear set may be a long pinion type planetary gear set having four rotary elements including a first sun gear and a third sun gear, and a first carrier and a first ring gear, which are independently engaged with one long pinion, the second planetary gear set may be a single pinion planetary gear set including a second sun gear, a second carrier, and a second ring gear; a first clutch may be disposed between the rotary element, the rotation of which is restrained by the first brake, of the second planetary gear set and the rotary elements of the first planetary gear set, and the engine may be connected to the first ring gear of the first planetary gear set. In this case, the first carrier of the first planetary gear set and the second sun gear of the second planetary gear set may be directly connected.

Preferably, the power trains may further comprise a second clutch that is configured to disconnectably connect the first carrier of the first planetary gear set with the second sun gear of the second planetary gear set.

Suitably, the long pinion of the first planetary gear set may have the same number of gear teeth at the portions where the first sun gear is engaged and the third sun gear is engaged. Also suitably, the long pinion of the first planetary gear set may have different numbers of teeth at the portions where the first sun gear is engaged and the third sun gear is engaged.

According to the present invention, a power train for a hybrid vehicle can achieve a fixed gear ratio mode where a vehicle is driven at a fixed gear ratio, such as shift stages of common transmission, only by the driving force of an engine without driving a motor generator, as well as an electric vehicle mode and a hybrid mode that are basic driving modes of a hybrid vehicle, such that it is possible to drive the vehicle with high efficiency in accordance with traveling conditions of the vehicle and improve fuel efficiency.

Further, the present invention can provide a power train for a hybrid vehicle that makes it possible to set the number of gear teeth of a sun gear and a pinion of a planetary gear set, which is a component, in various ways, such that it is possible to more freely select the capacity of a clutch or a motor generator and design a compact transmission.

The above and other features and advantages will be apparent from or are set forth in more detail in the accompanying drawings, which are incorporated herein, and the following Detailed Description of the Invention, which together serve to explain certain principles of the present invention.

DETAILED DESCRIPTION OF EMBODIMENTS

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
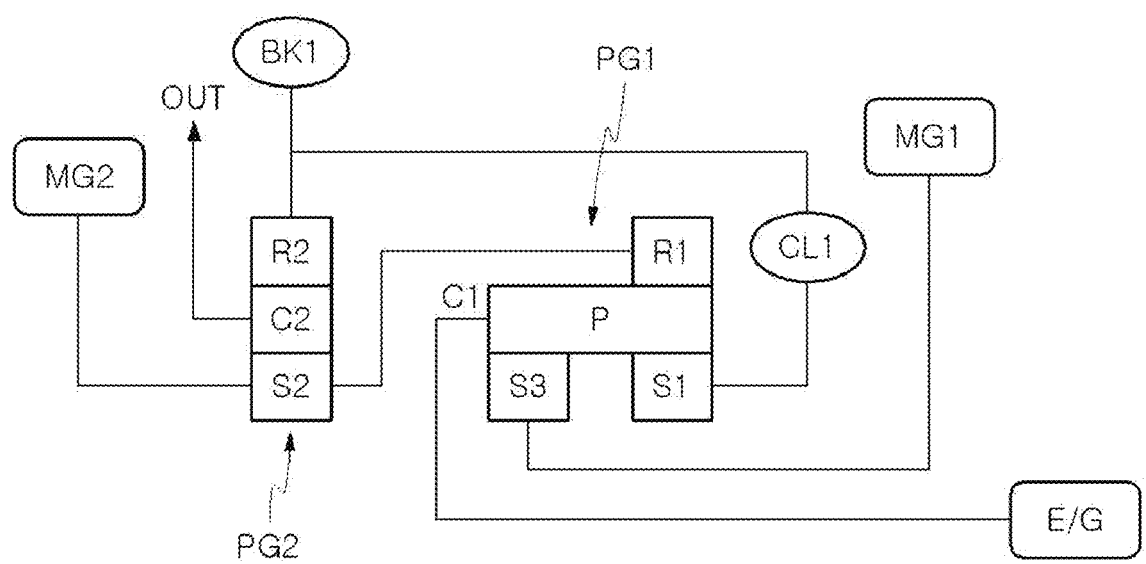
FIG. 1 is a diagram illustrating the structure of a power train for a hybrid vehicle according to a first embodiment of the present invention.

Referring to FIG. 1, a power train for a hybrid vehicle according to a first embodiment of the present invention includes: a first planetary gear set PG1 that has at least four rotary elements; a second planetary gear set PG2 that has three rotary elements two of which are connected with two of the rotary elements of the first planetary gear set PG1 and at least one of which is disconnectably connected; and a first brake BK1 that is provided to restrain rotation of one rotary element of the second planetary gear set PG2. In addition, at least two or more independent power sources and an output element OUT are connected to the rotary elements of the first planetary gear set PG1 and the second planetary gear set PG2.

Preferably, the rotary element, the rotation of which is restrained by the first brake BK1, of second planetary gear set PG2 is disconnectably connected with a rotary element of the first planetary gear set PG1 by a first clutch CL1, and the output element OUT is connected to the rotary element, which is not connected with the rotary elements of the first planetary gear set PG1, of the second planetary gear set PG2.

The power source includes an engine E/G and a first motor generator MG1 that are connected to the first planetary gear set PG1, and a second motor generator MG2 that is connected to the second planetary gear set PG2. The first planetary gear set PG1, the second planetary gear set PG2, the first motor generator MG1, and the second motor generator MG2 are arranged such that their rotary shafts overlap each other to form a single shaft.

The first planetary gear set PG1 is a long pinion type planetary gear set composed of four rotary elements including a first sun gear S1 and a third sun gear S3 that are independently engaged with one long pinion P. Two rotary elements of the first planetary gear set PG1 that are not connected to the engine E/G and the first motor generator MG1 are at least disconnectably connected with the rotary elements of the second planetary gear set PG2.

The term 'at least disconnectable connection' or other similar term used herein includes the structure in which rotary elements are directly connected with each other such that the connection is always maintained and the structure in which rotary elements are not directly connected with each other, but connected by a clutch, etc.

The engine E/G is connected to a first carrier C1 of the first planetary gear set PG1, the first motor generator MG1 is connected to the third sun gear S3 of the first planetary gear set PG1, the second motor generator MG2 is connected to a second sun gear S2 of the second planetary gear set PG2, the output element OUT is connected to a second carrier C2 of the second planetary gear set PG2, the first brake BK1 is connected to a second ring gear R2 of the second planetary gear set PG2, and the first clutch CL1 is disposed between the first sun gear S1 of the first planetary gear set PG1 and the second ring gear R2 of the second planetary gear set PG2.

In particular, in the first embodiment of FIG. 1, the first ring gear R1 of the first planetary gear set PG1 and the second sun gear S2 of the second planetary gear set PG2 are directly connected.

Figure 2:
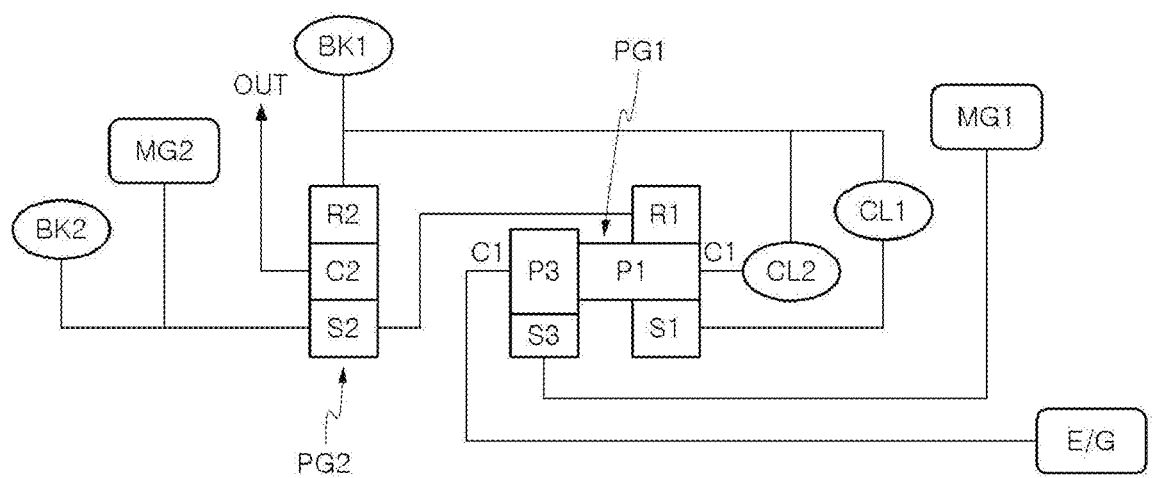
FIG. 2 is a diagram illustrating the structure and driving mode table of a power train for a hybrid vehicle according to a second embodiment of the present invention a second embodiment according to the present invention.

On the other hand, a power train according to a second embodiment of FIG. 2 further includes: a second brake BK2 that is disposed to restrain rotation of the second sun gear S2 of the second planetary gear set PG2; and a second clutch CL2 that is disposed to disconnectably connect the first carrier C1 of the first planetary gear set PG1 with the second ring gear R2 of the second planetary gear set PG2.

Figure 3:
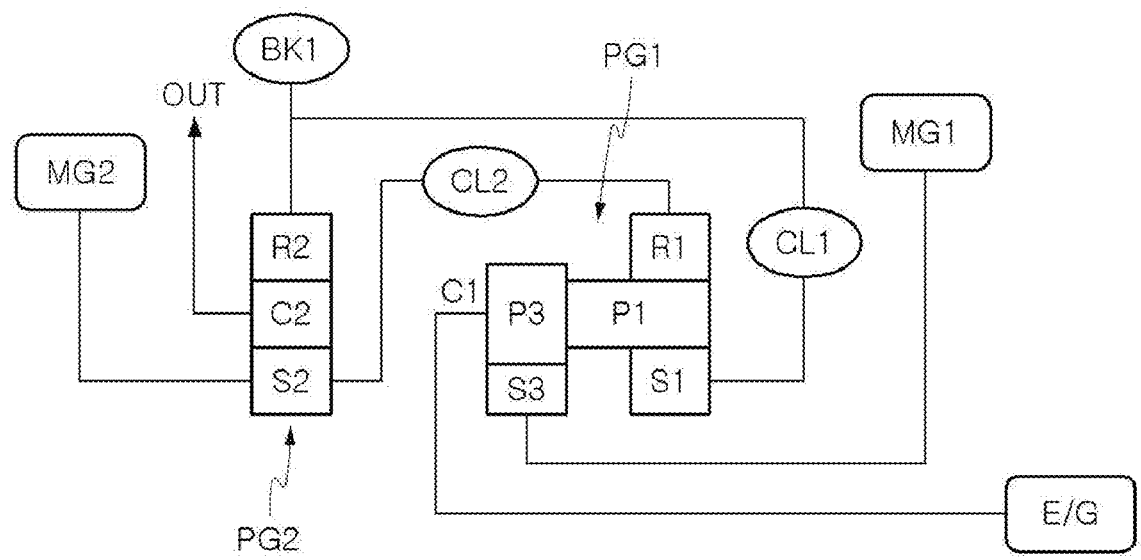
FIG. 3 is a diagram illustrating the structure of a power train for a hybrid vehicle according to a third embodiment of the present invention.

Further, a power train according to a third embodiment of FIG. 3 is different from that of the first embodiment of FIG. 1 in that the first ring gear R1 of the first planetary gear set PG1 is not directly connected with the second sun gear S2 of second planetary gear set PG2, but is disconnectably connected by the second clutch CL2.

Figure 4:
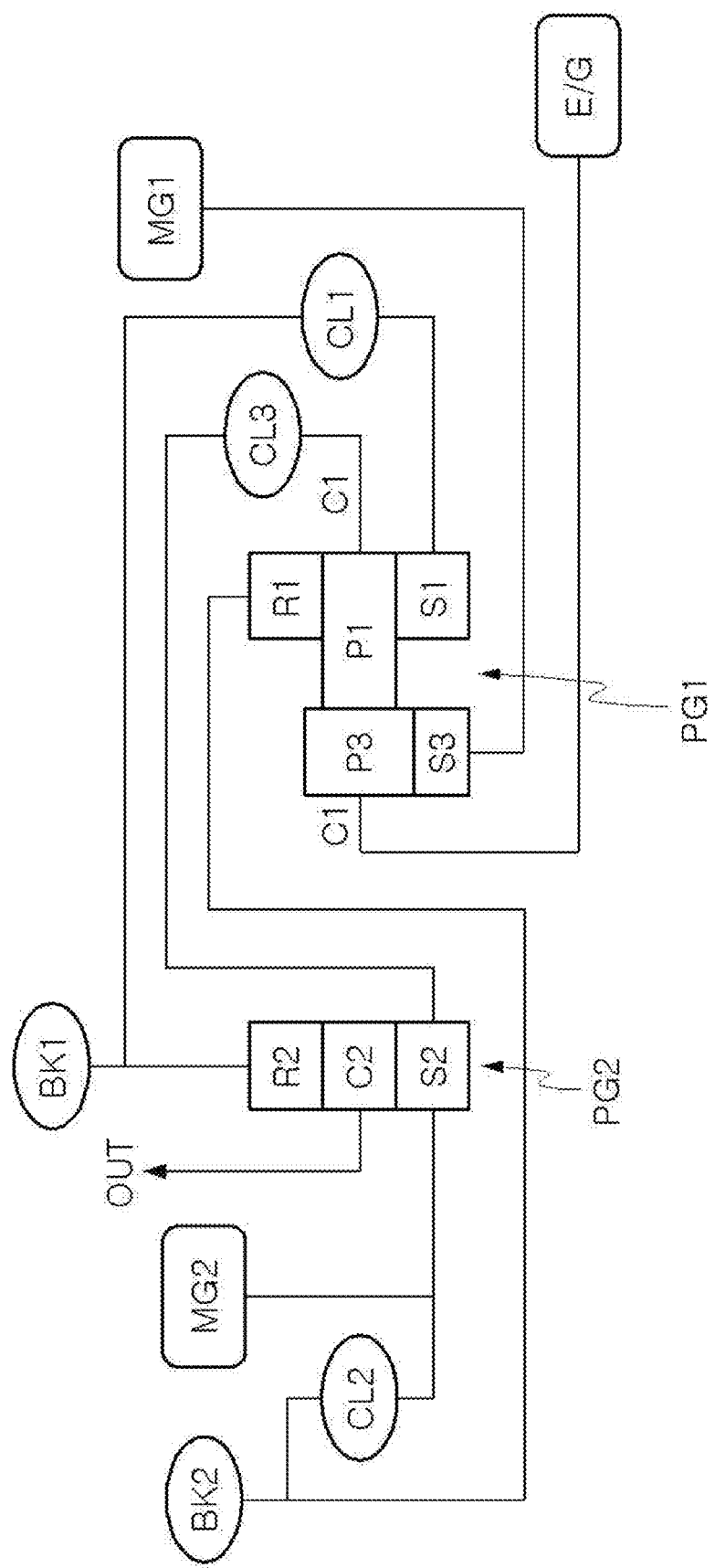
FIG. 4 is a diagram illustrating the structure of a power train for a hybrid vehicle according to a fourth embodiment of the present invention.

Further, a power train according to a fourth embodiment of FIG. 4 is the same as that of the first embodiment of FIG. 1 except that it further includes: a second brake BK2 that is disposed to restrain rotation of the first ring gear R1 of the first planetary gear set PG1; a second clutch CL2 that is provided to disconnectably connect the first ring gear R1 of the first planetary gear set PG1 with the second sun gear S2 of the second planetary gear set PG2; and a third clutch CL3 that is provided to disconnectably connect the first carrier C1 of the first planetary gear set PG1 with the second sun gear S2 of the second planetary gear set PG2 and except that the first ring gear R1 of the first planetary gear set PG1 is not directly connected with the second sun gear S2 of the second planetary gear set PG2.

The power trains according to the first to fourth embodiments, as shown in FIG. 2, can be operated in an electric vehicle (EV) mode, a hybrid (HEV) mode, and a fixed gear ratio mode can be achieved by various combinations of operation of the first clutch CL1, the second clutch CL2, the first brake BK1, and the second brake BK2.

The EV mode is achieved by engaging the first brake BK1. In this mode, the engine E/G is stopped and the second ring gear R2 of the second planetary gear set PG2 is basically fixed. Two electric vehicle modes of an EV1 mode and an EV2 mode can be achieved in accordance with whether the second clutch CL2 is additionally engaged.

The HEV mode is achieved by engaging only any one of the first brake BK1, the first clutch CL1, and the second clutch CL2. In this mode, power outputted from the engine E/G and a driving force combined by driving the first motor generator MG1 and the second motor generator MG2 are outputted to the output element OUT, such that three hybrid modes of an HEV1, an HEV2, and an HEV3 can be achieved.

The fixed gear ratio mode can be achieved in first to fourth stage modes at a predetermined shift ratio while only engine E/G is driven as shown in the figure.

The first stage fixed gear ratio mode is achieved by engaging the first clutch CL1 and the first brake BK1. In this mode, as the first sun gear S1 and the second ring gear R2 are fixed by the first brake BK1 and the first clutch CL1, power received by the first carrier C1 from the engine E/G is outputted through the second carrier C2 via the first ring gear R1 and the second sun gear S2 while being reduced.

The second stage fixed gear ratio mode is achieved by engaging the second clutch CL2 and the second brake BK2. In this mode, as the second sun gear S2 is fixed by the second brake BK2, power from the engine E/G is transmitted from the first carrier C1 to the second ring gear R2 by the second clutch C2. That is, the power is outputted through the second carrier while being reduced by a reduction ratio of the second planetary gear set PG2.

The third stage fixed gear ratio mode is achieved by engaging the first clutch CL1 and the second clutch CL2. In this mode, as the first planetary gear set PG1 and the second planetary gear set PG2 become integral, power from the engine E/G is outputted through the second carrier C2 with the ratio of 1:1.

The fourth stage fixed gear ratio mode is achieved by engaging the first clutch CL1 and the second brake BK2. In this mode, as the second sun gear S2 and the first ring gear R1 are fixed by the second brake BK2, power from the engine E/G is transmitted from the first carrier C1 to the first sun gear S1 while being increased, and then outputted through the second carrier C2 via the first clutch CL1 and the second ring gear R2.

It is possible to improve the fuel efficiency while effectively driving the hybrid vehicle by appropriately combining various driving modes in accordance with traveling conditions of a vehicle.

Figure 5:
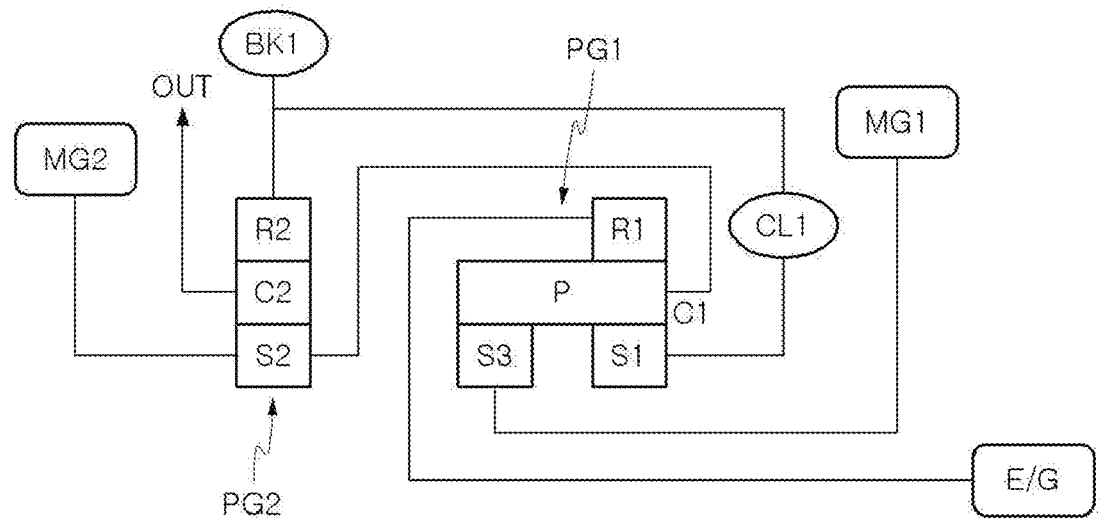
FIG. 5 is a diagram illustrating the structure of a power train for a hybrid vehicle according to a fifth embodiment of the present invention.
Figure 6:
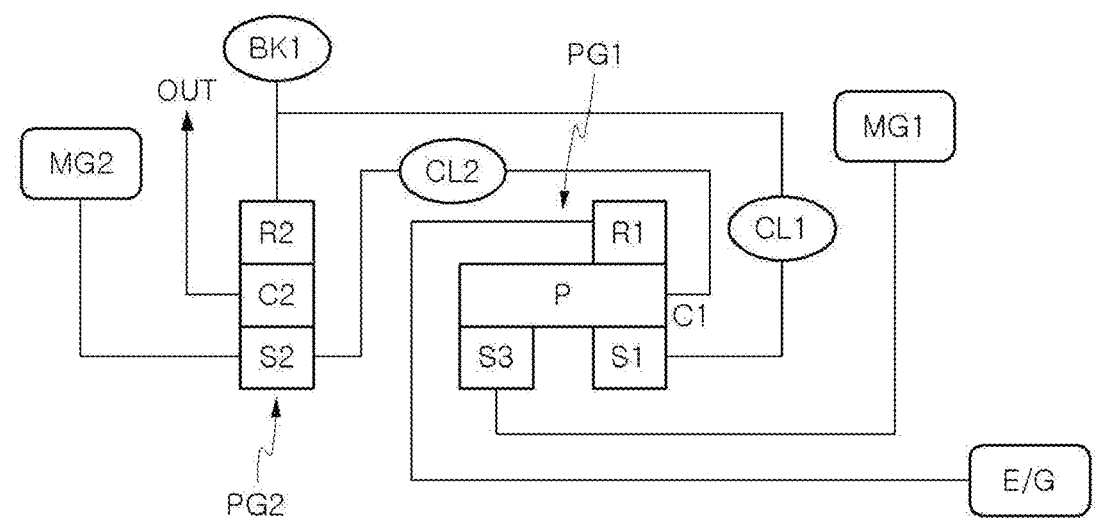
FIG. 6 is a diagram illustrating the structure of a power train for a hybrid vehicle according to a sixth embodiment of the present invention.

Power trains according to a fifth embodiment of FIG. 5 and a sixth embodiment of FIG. 6 are the same in that the engine E/G is connected to the first ring gear R1 of the first planetary gear set PG1, the first motor generator MG1 is connected to the third sun gear S3 of the first planetary gear set PG1, the second motor generator MG2 is connected to the second sun gear S2 of the second planetary gear set PG2, the output element OUT is connected to the second carrier C2 of the second planetary gear set PG2, the first brake BK1 is connected to the second ring gear R2 of the second planetary gear set PG2, and the first clutch CL1 is disposed between the first sun gear S1 of the first planetary gear set PG1 and the second ring gear R2 of the second planetary gear set PG2.

There is a difference in that the first carrier C1 of the first planetary gear set PG1 is directly connected with the second sun gear S2 of the second planetary gear set PG2 in the fifth embodiment of FIG. 5 whereas the first carrier C1 of the first planetary gear set PG1 and the second sun gear S2 of the second planetary gear set PG2 can be disconnectably connected by the second clutch CL2 in the sixth embodiment of FIG. 6.

The power trains according to the fifth embodiment of FIG. 5 and the sixth embodiment of FIG. 6 are different from those according to the embodiments of FIG. 1 and FIG. 3 only in that the engine E/G is connected to the first carrier C1 or the first ring gear R1 of the first planetary gear set PG1, and the resulting connection of the rotary elements of the first planetary gear set PG1 and the second planetary gear set PG2.

In all of the first to sixth embodiments, long pinion P of the first planetary gear set PG1 can have the same number of gear teeth at the portions where the first sun gear S1 is engaged and the third sun gear S3 is engaged, or can have different numbers of teeth at a first pinion portion P2 where the first sun gear S1 is engaged and at a third pinion portion P3 where the third sun gear S3 is engaged.

For reference, in the figures, long pinions having the same number of gear teeth at the portions where the first sun gear S1 is engaged and the third sun gear S3 is engaged are simply designated by 'P', and long pinion having a first pinion portion and a third pinion portion with different numbers of teeth are designated not by 'P', but 'P1' and 'P3'.

FIGS. 1, 5 and 6 show examples of long pinions P having the same number of gear teeth at portions where the first sun gear S1 is engaged and the second sun gear S2 is engaged, and FIGS. 2 and 4 show examples of long pinions divided into a first pinion portion p1 and a third pinion portion P3 having different numbers of teeth.

When the long pinion has a step formed by a first pinion portion P1 and a third pinion portion P3 and the first sun gear S1 and the third sun gear S3 are engaged with the portions, respectively, as shown in FIGS. 2 and 4, it is possible to independently set the relationship of the number of gear teeth of the first pinion portion P1 and the first sun gear S1 and the relationship of the number of gear teeth of the third pinion portion P3 and the third sun gear S3. Therefore, it is possible to design the capacity of the first clutch CL1 connected to the first sun gear S1 while adjusting the relationship of the number of gear teeth of the first pinion unit P1 and the first sun gear S1 and to design the capacity of the first motor generator MG1 connected to the third sun gear S3 while adjusting the relationship of the number of gear teeth of the third pinion portion P3 and the third sun gear S3, such that it is possible to achieve more free design and design a compact transmission.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power train for a hybrid vehicle comprising:
a first planetary gear set that has at least four rotary elements;
a second planetary gear set that has three rotary elements, one of which are at least disconnectably connected to the first planetary gear set; and
a first brake that is configured to restrain rotation of one rotary element of the second planetary gear set,
wherein at least two or more independent power sources and an output element are connected to the rotary elements of the first planetary gear set and the second planetary gear set,
wherein the rotary element, the rotation of which is restrained by the first brake, of the second planetary gear set is disconnected or connected with a rotary element of the first planetary gear set by a first clutch, and
the output element is connected to the rotary element, which is not connected with the rotary elements of the first planetary gear set, of the second planetary gear set, and
wherein the power source comprises:
an engine and a first motor generator that are connected to the first planetary gear set; and
a second motor generator that is connected to the second planetary gear set, and
wherein the first planetary gear set is a long pinion type planetary gear set having four rotary elements including a first sun gear and a third sun gear that are independently engaged with one long pinion, and
two rotary elements, which are not connected to the engine and the first motor generator, of the first planetary gear set are at least disconnected or connected with the rotary elements of the second planetary gear set, and
wherein the engine is connected to a first carrier of the first planetary gear set, the first motor generator is connected to a third sun gear of the first planetary gear set,
the second motor generator is connected to a second sun gear of the second planetary gear set,
the output element is connected to a second carrier of the second planetary gear set,
the first brake is connected to a second ring gear of the second planetary gear set, and
the first clutch is disposed between the first sun near of the first planetary gear set and the second ring near of the second planetary gear set.

2. The power train for a hybrid vehicle as defined in claim 1, wherein the first ring gear of the first planetary gear set and the second sun gear of the second planetary gear set are directly connected.

3. The power train for a hybrid vehicle as defined in claim 2, further comprising:
 a second brake that is configured to restrain rotation of the second sun gear of the second planetary gear set; and
 a second clutch that is configured to connect or disconnect the first carrier of the first planetary gear set to the second ring gear of the second planetary gear set.

4. The power train for a hybrid vehicle as defined in claim 1, further comprising:
 a second clutch that is configured to disconnectably connect the first ring gear of the first planetary gear set with the second sun gear of the second planetary gear set.

5. The power train for a hybrid vehicle as defined in claim 1, further comprising:
 a second brake that is configured to restrain rotation of the first ring gear of the first planetary gear set;
 a second clutch that is configured to disconnectably connect the first ring gear of the first planetary gear set with the second sun gear of the second planetary gear set; and
 a third clutch that is configured to disconnectably connect the first carrier of the first planetary gear set with the second sun gear of the second planetary gear set.

6. The power train for a hybrid vehicle as defined in claim 1, wherein the engine is connected to a first ring gear of the first planetary gear set,
 the first motor generator is connected to a third sun gear of the first planetary gear set,
 the second motor generator is connected to a second sun gear of the second planetary gear set,
 the output element is connected to a second carrier of the second planetary gear set,
 the first brake is connected to a second ring gear of the second planetary gear set, and
 the first clutch is disposed between the first sun gear of the first planetary gear set and the second ring gear of the second planetary gear set.

7. The power train for a hybrid vehicle as defined in claim 6, wherein the first carrier of the first planetary gear set and the second sun gear of the second planetary gear set are directly connected.

8. The power train for a hybrid vehicle as defined in claim 6, further comprising:
 a second clutch that is configured to disconnectably connect the first carrier of the first planetary gear set with the second sun gear of the second planetary gear set.

9. The power train for a hybrid vehicle as defined in claim 1, wherein the long pinion of the first planetary gear set has the same number of gear teeth at the portions where the first sun gear is engaged and the third sun gear is engaged.

10. The power train for a hybrid vehicle as defined in claim 1, wherein the long pinion of the first planetary gear set has different numbers of teeth at the portions where the first sun gear is engaged and the third sun gear is engaged.

11. A power train for a hybrid vehicle, comprising:
 a first planetary gear set that has four rotary elements;
 a second planetary gear set that has total three rotary elements, two of which are at least disconnectably connected to the first planetary gear set;
 a first brake that is configured to restrain rotation of one rotary element of the second the planetary gear set, which are at least disconnectably connected to the first planetary gear set;
 an output element that is connected to the rotary element of the second planetary gear set, which is not the rotary elements of the second planetary gear set that are at least disconnectably connected to the first planetary gear set; and
 at least two power sources that are disposed to independently apply driving force to the rotary elements of the first planetary gear set and the second planetary gear set, wherein the power source comprises:
 an engine and a first motor generator that are connected to the rotary elements of the first planetary gear set, respectively; and
 a second motor generator that is connected to the rotary element, which is at least disconnectably connected to the rotary element of the first planetary gear set, of the second planetary gear set, and
 wherein the first planetary gear set is a long pinion type planetary gear set having four rotary elements including a first sun gear and a third sun gear, and a first carrier and a first ring gear, which are independently engaged with one long pinion,
 the second planetary gear set is a single pinion planetary gear set including a second sun gear, a second carrier, and a second ring gear,
 a first clutch is disposed between the rotary element, the rotation of which is restrained by the first brake, of the second planetary gear set and the rotary elements of the first planetary gear set, and
 the engine is connected to the first carrier of the first planetary gear set, and
 wherein the first ring gear of the first planetary gear set and the second sun gear of the second planetary gear set are directly connected.

12. The power train for a hybrid vehicle as defined in claim 11, wherein the first ring gear of the first planetary gear set and the second sun gear of the second planetary gear set are directly connected, and
 the power train for a hybrid vehicle further comprises:
 a second brake that is configured to restrain rotation of the second sun gear of the second planetary gear set; and
 a second clutch that is configured to disconnectably connect the first carrier of the first planetary gear set with the second ring gear of the second planetary gear set.

13. The power train for a hybrid vehicle as defined in claim 11, further comprising:
 a second clutch that is configured to disconnectably connect the first ring gear of the first planetary gear set with the second sun gear of the second planetary gear set.

14. The power train for a hybrid vehicle as defined in claim 11, further comprising:
 a second brake that is configured to restrain rotation of the first ring gear of the first planetary gear set;
 a second clutch that is configured to disconnectably connect the first ring gear of the first planetary gear set with the second sun gear of the second planetary gear set; and
 a third clutch that is configured to disconnectably connect the first carrier of the first planetary gear set with the second sun gear of the second planetary gear set.

15. The power train for a hybrid vehicle as defined in claim 11, wherein the first planetary gear set is a long pinion type planetary gear set having four rotary elements including a first sun gear and a third sun gear, and a first carrier and a first ring gear, which are independently engaged with one long pinion,
 the second planetary gear set is a single pinion planetary gear set including a second sun gear, a second carrier, and a second ring gear;

a first clutch is disposed between the rotary element, the rotation of which is restrained by the first brake, of the second planetary gear set and the rotary elements of the first planetary gear set, and the engine is connected to the first ring gear of the first planetary gear set.

16. The power train for a hybrid vehicle as defined in claim 15, wherein the first carrier of the first planetary gear set and the second sun gear of the second planetary gear set are directly connected.

17. The power train for a hybrid vehicle as defined in claim 15, further comprising:

a second clutch that is configured to disconnectably connect the first carrier of the first planetary gear set with the second sun gear of the second planetary gear set.

18. The power train for a hybrid vehicle as defined in claim 11, wherein the long pinion of the first planetary gear set has the same number of gear teeth at the portions where the first sun gear is engaged and the third sun gear is engaged.

19. The power train for a hybrid vehicle as defined in claim 11, wherein the long pinion of the first planetary gear set has different numbers of teeth at the portions where the first sun gear is engaged and the third sun gear is engaged.

20. A power train for a hybrid vehicle comprising:

a first planetary gear set that has at least four rotary elements;

a second planetary gear set that has three rotary elements, two of which are connected with two of the rotary elements of the first planetary gear set and at least one of which is disconnected or connected; and a first brake that is configured to restrain rotation of one rotary element of the second planetary gear set, wherein at least two or more independent power sources and an output element are connected to the rotary elements of the first planetary gear set and the second planetary gear set, and wherein the engine is connected to a first carrier of the first planetary gear set, the first motor generator is connected to a third sun gear of the first planetary gear set, the second motor generator is connected to a second sun gear of the second planetary gear set, the output element is connected to a second carrier of the second planetary gear set, the first brake is connected to a second ring gear of the second planetary gear set, and the first clutch is disposed between the first sun gear of the first planetary gear set and the second ring gear of the second planetary gear set.

21. The power train for a hybrid vehicle as defined in claim 20, wherein the rotary element, the rotation of which is restrained by the first brake, of the second planetary gear set is disconnected or connected with a rotary element of the first planetary gear set by a first clutch, and the output element is connected to the rotary element, which is not connected with the rotary elements of the first planetary gear set, of the second planetary gear set.

22. The power train for a hybrid vehicle as defined in claim 21, wherein the power source includes:

an engine and a first motor generator that are connected to the first planetary gear set; and a second motor generator that is connected to the second planetary gear set.

* * * * *